Oct. 11, 1960     L. H. GARDNER     2,955,539
POSITIVE DISPLACEMENT PUMP
Filed May 28, 1959
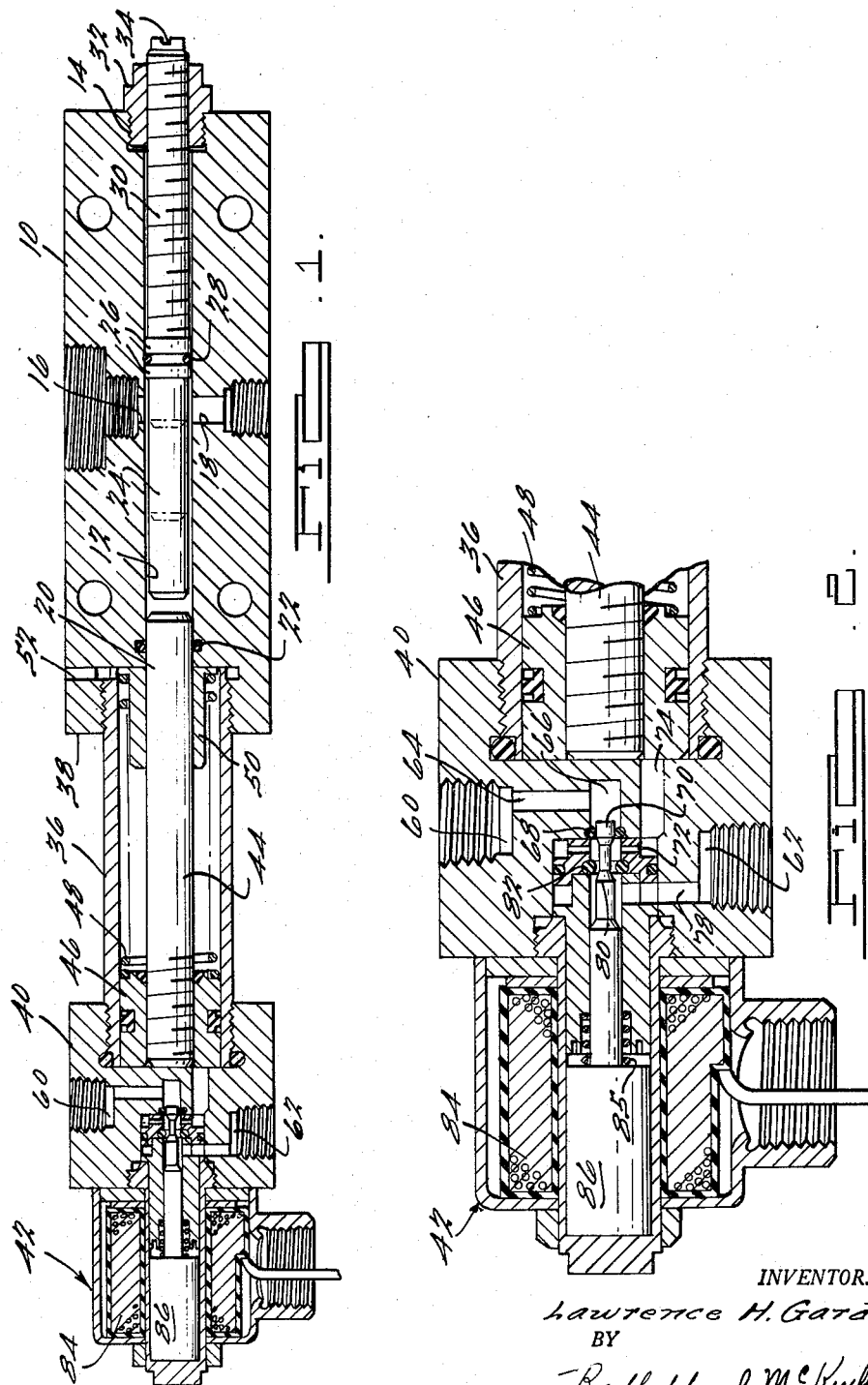
INVENTOR.
Lawrence H. Gardner
BY
Balluff and McKinley
ATTORNEYS.

United States Patent Office 2,955,539
Patented Oct. 11, 1960

2,955,539
POSITIVE DISPLACEMENT PUMP
Lawrence H. Gardner, North Olmsted, Ohio
(7313 Associate Ave., Cleveland 9, Ohio)
Filed May 28, 1959, Ser. No. 816,448
1 Claim. (Cl. 103—38)

This invention relates to reciprocating pumps and has particular reference to a positive displacement pump of the reciprocating type in which provisions are made for varying and accurately adjusting the displacement of the pump.

A principal object of the invention is to provide a novel and simple reciprocating type of pump in which provision is made for accurately adjusting and varying the output thereof.

Other and further objects of the invention will be apparent from the following description and claim and may be understood by reference to the accompanying drawing, which by way of illustration shows a preferred embodiment of the invention and what I now consider to be the best mode of applying the principles thereof. Other embodiments of the invention may be used without departing from the scope of the present invention as set forth in the appended claim.

In the drawing:

Fig. 1 is a longitudinal sectional view of a pump embodying the invention; and

Fig. 2 is an enlarged fragmentary sectional view of the air control valve therefor.

As illustrated in the drawing, the pump comprises a block 10 provided with a pump cylinder bore 12 terminating at one end in an enlarged threaded hole 14, the cylinder bore being provided with an inlet port 16 and a discharge port 18. Suitable valves (not shown) are associated with such ports 16 and 18 for preventing return flow of liquid through the ports 16 and 18. A piston 20 is reciprocable in the bore 12 and a suitable seal 22 disposed in a recess surrounding the bore 12 cooperates with the piston 20 to prevent liquid being pumped from by-passing the piston.

A stop member 24 in the form of a rod is disposed in and movable axially of the bore 12, and preferably is of smaller cross section than the bore 12. A pair of lands 26 formed on the rod 24 have a sliding fit in the bore 12 and have an O-ring type of seal 28 therebetween so as to prevent loss of liquid from the bore 12 around the rod 24. The projecting end 30 of the rod is threaded, and a nut 32 secured in the threaded hole 14 has the threaded end 30 of the rod threaded therethrough whereby the rod or member 24 may be adjusted axially of the cylinder bore. This not only varies the displacement volume of the pump chamber, but also serves as an adjustable stop for the piston 20. The exposed end of the rod 24 is provided with a kerf 34 whereby a screwdriver may be employed to adjust the position of the rod 24 in the pump cylinder bore 12.

An air cylinder 36 has one end thereof threaded into the internally threaded end 38 of the block 10 while the base 40 of a valve assembly indicated generally at 42 is mounted on the other end of the air cylinder 36. A connecting rod portion 44 of the piston 20 extends into the air cylinder 36 and has an air piston 46 mounted thereon. A spring 48 surrounding the connecting rod portion 44 is confined between the air piston 46 and the guide 50 which is seated against the end of the block 10 for biasing the pistons 46 and 20 in one direction, that is, to retract the piston 20 from its cylinder bore 12. The block is provided with a bleed hole 52 which ports the space in the cylinder 36 between the piston 46 and the guide 50 to atmosphere.

The control valve 42 is a solenoid-operated valve which controls the supply of air under pressure to the air cylinder 36 and the exhaust thereof for effecting the reciprocation of the air piston 46 and the piston 20 thereby. The base 40 is provided with an air pressure inlet 60 and an exhaust port 62. The inlet 60 is connected by a passage 64 to a center bore 66 on one side of an annular valve seat 68 provided by an O-ring seated in a recess in the side of the bore 66. As shown, a valve member 70 is seated on the valve seat 68 so that the valve 68, 70 is closed. Passages 72 on the other side of the valve 68, 70 communicate with a passage 74 which communicates with one end of the air cylinder 36 on the side opposite the spring 48 whereby air under pressure may be supplied to the air cylinder 36 when the valve 68, 70 is open for moving the piston 46 and effecting the displacement stroke of the piston 20. In the position in which the valve is shown, the air feed to the cylinder 36 is cut off by the valve 68, 70, while the air cylinder is ported through passage 74, passages 72, center bore 66, and passage 78 to the exhaust port 62.

The valve member 70 is formed on the end of a valve stem which is also provided with a valve member 80 cooperable with a valve seat 82 provided by an annular O-ring for shutting off the atmospheric communication between the air cylinder 36 and the exhaust port 62. The valve member 82 as illustrated consists of an O-ring mounted in an annular recess around the valve bore 66. The valve 42 is solenoid actuated and is shown deenergized, spring 85 acting on the core 86 to close valve 68, 70. Energization of the coil 84 will shift the core 86 to which the valve stem is connected so as to shift valve member 80 into sealing engagement with its seat 82 and to shift the valve member 70 out of sealing engagement with its seat 68 whereby air under pressure may be supplied to the air cylinder. The solenoid of the valve 42 may be constructed so as to operate at any suitable frequency, and it will be evident that if a suitable supply of air under pressure is connected to the port 60, the piston 20 of the pump may be reciprocated at any suitable rate. The length of the displacement stroke of the piston 20, however, will depending upon the adjusted position of the stop member 24.

The arrangement for adjusting the displacement chamber of the pump provides a fine adjustment whereby the output of the pump may be accurately regulated over a wide range.

While I have illustrated and described a preferred embodiment of my invention, it is understood that this is capable of modification, and I therefore do not wish to be limited to the precise details set forth but desire to avail myself of such changes and alteration as fall within the purview of the following claim.

I claim:

A positive displacement pump comprising a block provided with a pump cylinder bore terminating at one end in an enlarged threaded hole and having an inlet and an outlet in the side wall of said bore, a member in and movable axially of said cylinder bore and having a threaded stem projecting through and threaded in said hole whereby the inner end of said member is adjustable in said cylinder bore so as to vary the displacement volume of said bore, a piston reciprocable in said cylinder bore, said piston having a connecting rod portion which projects from the opposite end of said bore whereby said piston may be moved toward and away from the inner end of said member, said member forming a stop for the displacement stroke of said piston, an air cylinder mounted on the opposite end of said block and having an air piston therein mounted on the projecting end of said connecting rod portion, a spring surrounding the projecting end of said connecting rod portion and confined between said air piston and block for moving said pump piston outwardly in said cylinder bore, a normally closed valve mounted on the air cylinder and an air pressure line controlled by such valve communicating with said air cylinder, said valve being operable for controlling the supply of air under pressure to said air cylinder and the exhaust thereof through said line for effecting the reciprocation of said air piston.

References Cited in the file of this patent

UNITED STATES PATENTS

| | | |
|---|---|---|
| 269,666 | Hays | Dec. 26, 1882 |
| 700,646 | Hartness | May 20, 1902 |
| 1,216,754 | Wattles | Feb. 20, 1917 |
| 2,287,760 | Hicks | June 23, 1942 |
| 2,300,110 | De Hoog | Oct. 27, 1942 |
| 2,576,747 | Bryant | Nov. 27, 1951 |
| 2,577,572 | Ferber | Dec. 4, 1951 |
| 2,781,728 | Fischer et al. | Feb. 19, 1957 |
| 2,814,252 | Volk | Nov. 26, 1957 |